(12) United States Patent
Brady et al.

(10) Patent No.: US 8,198,492 B2
(45) Date of Patent: *Jun. 12, 2012

(54) PRODUCTION OF TRANSPORTATION FUEL FROM RENEWABLE FEEDSTOCKS

(75) Inventors: John P. Brady, Algonquin, IL (US);
Tom N. Kalnes, LaGrange, IL (US);
Terry L. Marker, Palos Heights, IL (US)

(73) Assignee: UOP LLC, Des Plaines, IL (US)

( * ) Notice: Subject to any disclaimer, the term of this patent is extended or adjusted under 35 U.S.C. 154(b) by 660 days.

This patent is subject to a terminal disclaimer.

(21) Appl. No.: 12/403,024

(22) Filed: Mar. 12, 2009

(65) Prior Publication Data

US 2009/0229172 A1  Sep. 17, 2009

Related U.S. Application Data

(60) Provisional application No. 61/037,094, filed on Mar. 17, 2008.

(51) Int. Cl.
*C10L 1/16* (2006.01)
*C10L 5/00* (2006.01)
*C07C 4/00* (2006.01)

(52) U.S. Cl. ............. 585/14; 585/240; 585/242; 44/605

(58) Field of Classification Search ............ 585/14, 585/240, 242; 44/605
See application file for complete search history.

(56) References Cited

U.S. PATENT DOCUMENTS

| | | |
|---|---|---|
| 5,186,722 A | 2/1993 | Cantrell et al. |
| 5,705,722 A | 1/1998 | Monnier et al. |
| 7,232,935 B2 * | 6/2007 | Jakkula et al. .............. 585/240 |
| 7,271,303 B1 | 9/2007 | Sechrist et al. |
| 7,279,018 B2 | 10/2007 | Jakkula et al. |
| 7,425,657 B1 | 9/2008 | Elliott et al. |
| 7,459,597 B2 | 12/2008 | Koivusalmi et al. |
| 7,491,858 B2 * | 2/2009 | Murzin et al. .............. 585/240 |
| 7,501,546 B2 * | 3/2009 | Koivusalmi et al. ......... 585/327 |
| 7,540,952 B2 | 6/2009 | Pinho et al. |
| 7,550,634 B2 * | 6/2009 | Yao et al. .................. 585/240 |
| 7,816,570 B2 * | 10/2010 | Roberts et al. ............. 585/240 |
| 7,960,597 B2 * | 6/2011 | Miller ...................... 585/240 |
| 7,982,078 B2 * | 7/2011 | Brady et al. ............... 585/240 |
| 7,999,143 B2 * | 8/2011 | Marker et al. .............. 585/240 |
| 2006/0186020 A1 | 8/2006 | Gomes |
| 2006/0207166 A1 | 9/2006 | Herskowitz et al. |
| 2006/0264684 A1 | 11/2006 | Petri et al. |
| 2007/0006523 A1 | 1/2007 | Myllyoja et al. |
| 2007/0010682 A1 | 1/2007 | Myllyoja et al. |

(Continued)

FOREIGN PATENT DOCUMENTS

CN 11270300 A 9/2008

(Continued)

*Primary Examiner* — Nina Bhat
(74) *Attorney, Agent, or Firm* — Maryann Maas

(57) ABSTRACT

A process has been developed for producing a diesel boiling point range product and an aviation boiling point range product from renewable feedstocks such as plant and animal oils. The process involves treating a renewable feedstock by hydrogenating and deoxygenating to provide a hydrocarbon fraction which is then isomerized and selectively cracked to form the diesel boiling point range product and the aviation boiling point range product. A portion of the diesel boiling point range product, aviation boiling point range product, naphtha product, LPG, or any combination thereof can be optionally used as a rectification agent in the selective hot high pressure hydrogen stripper to decrease the amount of product carried in the stripper overhead.

20 Claims, 4 Drawing Sheets

U.S. PATENT DOCUMENTS

| | | |
|---|---|---|
| 2007/0068848 A1 | 3/2007 | Monnier et al. |
| 2007/0131579 A1 | 6/2007 | Koivusalmi et al. |
| 2007/0135316 A1 | 6/2007 | Koivusalmi et al. |
| 2007/0135663 A1 | 6/2007 | Aalto et al. |
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1 | 11/2007 | Duarte Santiago et al. |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Ferreira Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077866 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0229174 A1 | 9/2009 | Brady et al. |
| 2009/0283442 A1 | 11/2009 | McCall et al. |
| 2011/0091953 A1* | 4/2011 | Bolin et al. ............ 435/167 |

FOREIGN PATENT DOCUMENTS

| | | |
|---|---|---|
| CN | 11343552 A | 1/2009 |
| EP | 1719811 A1 | 8/2006 |
| EP | 2046917 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

* cited by examiner

US 8,198,492 B2

PRODUCTION OF TRANSPORTATION FUEL FROM RENEWABLE FEEDSTOCKS

CROSS-REFERENCE TO RELATED APPLICATION

This application claims priority from Provisional Application Ser. No. 61/037,094 filed Mar. 17, 2008, the contents of which are hereby incorporated by reference in its entirety.

BACKGROUND OF THE INVENTION

This invention relates to a process for producing hydrocarbons useful as diesel fuel and aviation fuel from renewable feedstocks such as the triglycerides and free fatty acids found in materials such as plant oils, fish oils, animal fats, and greases. The process involves hydrogenation, deoxygenation (decarboxylation, decarbonylation, and/or hydrodeoxygenation) in at least a first zone and hydroisomerization and hydrocracking in at least a second zone. A selective hot high pressure hydrogen stripper is used to remove at least the carbon oxides from the hydrogenation, decarboxylation and/or hydrodeoxygenation zone effluent before entering the hydroisomerization and hydrocracking zone. Optionally, a diesel range stream, a naphtha range stream, a naphtha and LPG range stream, or any mixture thereof is used as an additional rectification agent in the selective hot high pressure hydrogen stripper to decrease the amount of product carried in the overhead thereby reducing the amount of n-paraffins in the diesel and aviation fuels.

As the demand for diesel fuel and aviation fuel increases worldwide there is increasing interest in sources other than petroleum crude oil for producing these fuels. One such source is what has been termed renewable feedstocks. These renewable feedstocks include, but are not limited to, plant oils such as corn, rapeseed, canola, soybean and algal oils, animal fats such as inedible tallow, fish oils and various waste streams such as yellow and brown greases and sewage sludge. The common feature of these feedstocks is that they are composed of triglycerides and Free Fatty Acids (FFA). Both of these compounds contain aliphatic carbon chains having from about 8 to about 24 carbon atoms. The aliphatic carbon chains in the triglycerides or FFAs can also be mono-, di- or poly-unsaturated. Some of the glycerides from the renewable sources may be monoglycerides or diglycerides instead of or in addition to the triglycerides.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling point range by hydroprocessing vegetable oils such as canola or sunflower oil. Finally, US 2004/0230085 A1 discloses a process for treating a hydrocarbon component of biological origin by hydrodeoxygenation followed by isomerization.

Described herein is a process which comprises one or more steps to hydrogenate, deoxygenate, isomerize and selectively hydrocrack a renewable feedstock in order to generate both a diesel range product and an aviation range product. Simply hydrogenating and deoxygenating the renewable feedstock in a hydrogen environment in the presence of a hydrotreating catalyst results in straight chain paraffins having chain-lengths similar to, or slightly shorter than, the fatty acid composition of the feedstock. With many feedstocks, this approach results in a fuel meeting the general specification for a diesel fuel, but not the specifications for an aviation fuel. The selective hydrocracking reaction reduces the carbon chain length to allow selectivity to aviation fuel range paraffins while minimizing lower molecular weight products. The volume ratio of recycle hydrocarbon to feedstock ranges from about 0.1:1 to about 8:1 and provides a mechanism to increase the hydrogen solubility and more uniformly distribute the heat of reaction in the reaction mixture. As a result of the recycle, some embodiments may use less reactor volume, less excess hydrogen, a lower operating pressure, or any combination of the above.

The performance of the isomerization and selective hydrocracking catalyst is improved by removing at least carbon dioxide from the feed to the isomerization and selective hydrocracking zone. The presence of oxygen containing molecules including water, carbon dioxide, and other carbon oxides may result in the deactivation of the isomerization catalyst. The oxygen containing molecules such as carbon dioxide, carbon monoxide and water are removed using a selective hot high pressure hydrogen stripper which optionally contains a rectification zone.

SUMMARY OF THE INVENTION

A hydroconversion process for producing a diesel boiling point range product and an aviation boiling point range product from a renewable feedstock wherein the process comprises treating the feedstock in a reaction zone by hydrogenating and deoxygenating the feedstock at reaction conditions to provide a first reaction zone product comprising n-paraffins. The carbon dioxide and water generated as byproducts in the first reaction zone are selectively removed from the first reaction product in an integrated hot high pressure stripper using hydrogen as the stripping gas. A diesel range stream, an aviation range stream, a naphtha range stream, a naphtha and LPG range stream or any mixture thereof may be optionally used as a rectification agent in the selective hot high pressure hydrogen stripper to decrease the amount of first reaction zone diesel and aviation range product carried in the overhead of the selective hot high pressure hydrogen stripper. The hydrogen stripped first reaction zone product is introduced to a hydroisomerization and selective cracking reaction zone. The selective hydrocracking allows for aviation fuel range products by preferentially cracking C1 to C6 fragments off the end of the longer chain paraffins and by minimizing the number of cracking events per molecule. The desired products, at least the diesel boiling point range product and the aviation boiling point range product, are recovered.

DETAILED DESCRIPTION OF THE INVENTION

Figure 1:
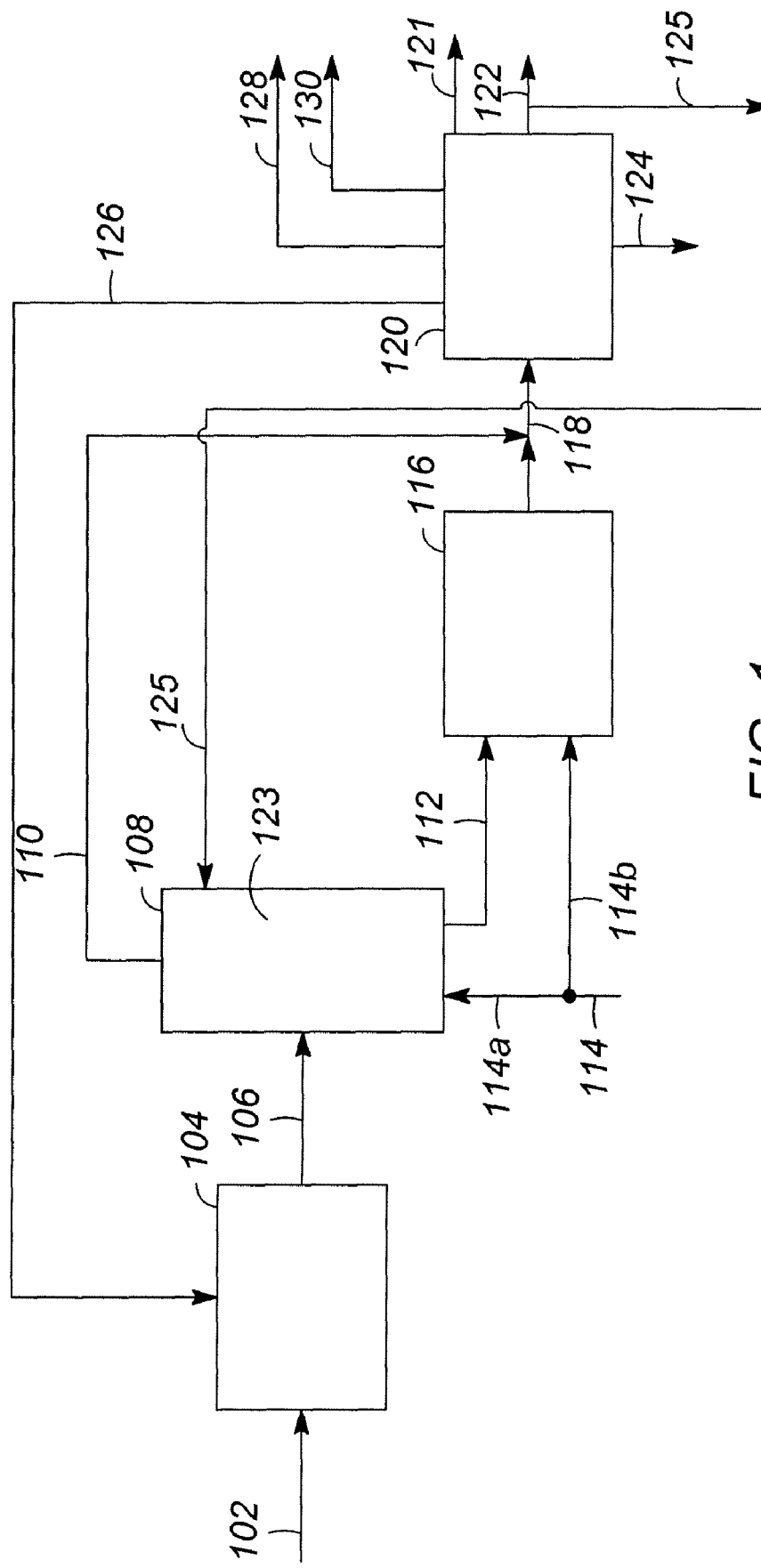
FIG. 1 is a schematic of one embodiment of the invention showing the option where a portion of the branched-paraffin-enriched product is conducted to the hot high pressure hydrogen stripper as an additional rectification agent to decrease the amount of first reaction zone product carried in the overhead of the selective hot high pressure hydrogen stripper.

As stated, the present invention relates to a process for producing a two hydrocarbon streams, a diesel boiling point range product and an aviation boiling point range product, from renewable feedstocks such as feedstocks originating from plants or animals. The term renewable feedstock is meant to include feedstocks other than those obtained from petroleum crude oil. Another term that has been used to describe this class of feedstock is biorenewable fats and oils. The renewable feedstocks that can be used in the present invention include any of those which comprise glycerides and free fatty acids (FFA). Most of the glycerides will be triglycerides, but monoglycerides and diglycerides may be present and processed as well. Another class of compounds appropriate for these processes fatty acid alkyl esters (FAAE), such as fatty acid methyl ester (FAME) or fatty acid ethyl ester (FAEE). Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, camelina oil, jatropha oil, crambe oil, tallow, yellow and brown greases, lard, train oil, fats in milk, fish oil, algal oil, sewage sludge, and the like. The glycerides and FFAs of the typical vegetable or animal fat contain aliphatic hydrocarbon chains in their structure which have about 8 to about 24 carbon atoms with a majority of the fats and oils containing high concentrations of fatty acids with 16 and 18 carbon atoms. Mixtures or co-feeds of renewable feedstocks and petroleum-derived hydrocarbons may also be used as the feedstock. Other feedstock components which may be used, especially as a co-feed component in combination with the above listed feedstocks include spent motor oils and industrial lubricants, used paraffin waxes, liquids derived from the gasification of coal, biomass, natural gas followed by a downstream liquefaction step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a petroleum based or other process into a valuable co-feed component to the current process.

The renewable feedstocks that can be used in the present invention may contain a variety of impurities. For example, tall oil is a byproduct of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow.

Another possible means for removing contaminants is a mild acid wash. This is carried out by contacting the feedstock with an aqueous acidic solution such as sulfuric, nitric, phosphoric, or hydrochloric in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing such as that described in U.S. Ser. No. 11/770,826, hereby incorporated by reference, is another pretreatment technique which may be employed.

The renewable feedstock is flowed to a first reaction zone comprising one or more catalyst beds in one or more reactors. The term "feedstock" is meant to include feedstocks that have not been treated to remove contaminants as well as those feedstocks purified in a pretreatment zone. In the reaction first zone, the feedstock is contacted with a hydrogenation or hydrotreating catalyst in the presence of hydrogen at hydrogenation conditions to hydrogenate the reactive components such as olefinic or unsaturated portions of the n-paraffinic chains. Hydrogenation and hydrotreating catalysts are any of those well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina or activated carbon. Hydrogenation conditions include a temperature of about 40° C. to about 400° C. and a pressure of about 689 kPa absolute (100 psia) to about 13,790 kPa absolute (2000 psia). In another embodiment the hydrogenation conditions include a temperature of about 200° C. to about 300° C. and a pressure of about 1379 kPa absolute (200 psia) to about 4826 kPa absolute (700 psia). Other operating conditions for the hydrogenation zone are well known in the art.

The catalysts enumerated above are also capable of catalyzing decarboxylation, decarbonylation and/or hydrodeoxygenation of the feedstock to remove oxygen. Decarboxylation, decarbonylation, and hydrodeoxygenation are herein collectively referred to as deoxygenation reactions. Decarboxylation conditions include a relatively low pressure of about 689 kPa (100 psia) to about 6895 kPa (1000 psia), a temperature of about 200° C. to about 400° C. and a liquid hourly space velocity of about 0.5 to about 10 $hr^{-1}$. In another embodiment the decarboxylation conditions include the same relatively low pressure of about 689 kPa (100 psia) to about 6895 kPa (1000 psia), a temperature of about 288° C. to about 345° C. and a liquid hourly space velocity of about 1 to about 4 $hr^{-1}$. Since hydrogenation is an exothermic reaction, as the feedstock flows through the catalyst bed the temperature increases and decarboxylation and hydrodeoxygenation will begin to occur. Thus, it is envisioned and is within the scope of this invention that all the reactions occur simultaneously in one reactor or in one bed. Alternatively, the conditions can be controlled such that hydrogenation primarily occurs in one bed and decarboxylation and/or hydrodeoxygenation occurs in a second bed. Of course if only one bed is used, then hydrogenation occurs primarily at the front of the bed, while decarboxylation/hydrodeoxygenation occurs mainly in the middle and bottom of the bed. Finally, desired hydrogenation can be carried out in one reactor, while decarboxylation, decarbonylation, and/or hydrodeoxygenation can be carried out in a separate reactor. However, the order of the deoxygenation reactions is not critical to the invention.

The reaction product from the hydrogenation and deoxygenation reactions will comprise both a liquid portion and a gaseous portion. The liquid portion comprises a hydrocarbon fraction comprising n-paraffins and having a large concentration of paraffins in the 15 to 18 carbon number range. Different feedstocks will result in different distributions of paraffins. A portion of this hydrocarbon fraction, after separation from the gaseous portion, may be used as the hydrocarbon recycle described above. Although this hydrocarbon fraction is useful as a diesel fuel or diesel fuel blending component, additional fuels, such as aviation fuels or aviation fuel blending components which typically have a concentration of paraffins in the range of about 9 to about 15 carbon atoms, may be produced with additional processing. Also, because the hydrocarbon fraction comprises essentially all n-paraffins, it will have poor cold flow properties. Many diesel and aviation fuels and blending components must have better cold flow properties and so the reaction product is further reacted under isomerization conditions to isomerize at least a portion of the n-paraffins to branched paraffins.

The gaseous portion comprises hydrogen, carbon dioxide, carbon monoxide, water vapor, propane and perhaps sulfur components such as hydrogen sulfide, nitrogen components such as ammonia, or phosphorous components such as phosphine. The effluent from the deoxygenation zone is conducted to a hot high pressure hydrogen stripper. One purpose of the hot high pressure hydrogen stripper is to selectively separate at least a portion of the gaseous portion of the effluent from the liquid portion of the effluent. As hydrogen is an expensive resource, to conserve costs, the separated hydrogen is recycled to the first reaction zone containing the deoxygenation reactor. Also, failure to remove the water, carbon monoxide, and carbon dioxide from the effluent may result in poor catalyst performance in the isomerization zone. Water, carbon monoxide, carbon dioxide, any ammonia or hydrogen sulfide are selectively stripped in the hot high pressure hydrogen stripper using hydrogen. The hydrogen used for the stripping may be dry, and free of carbon oxides. The temperature may be controlled in a limited range to achieve the desired separation and the pressure may be maintained at approximately the same pressure as the two reaction zones to minimize both investment and operating costs. The hot high pressure hydrogen stripper may be operated at conditions ranging from a pressure of about 689 kPa absolute (100 psia) to about 13,790 kPa absolute (2000 psia), and a temperature of about 40° C. to about 350° C. In another embodiment the hot high pressure hydrogen stripper may be operated at conditions ranging from a pressure of about 1379 kPa absolute (200 psia) to about 4826 kPa absolute (700 psia), or about 2413 kPa absolute (350 psia) to about 4882 kPa absolute (650 psia), and a temperature of about 50° C. to about 350° C. The hot high pressure hydrogen stripper may be operated at essentially the same pressure as the reaction zone. By "essentially", it is meant that the operating pressure of the hot high pressure hydrogen stripper is within about 1034 kPa absolute (150 psia) of the operating pressure of the reaction zone. For example, in one embodiment the hot high pressure hydrogen stripper separation zone is no more than 1034 kPa absolute (150 psia) less than that of the reaction zone.

The effluent enters the hot high pressure stripper and at least a portion of the gaseous components, are carried with the hydrogen stripping gas and separated into an overhead stream. The remainder of the deoxygenation zone effluent stream is removed as hot high pressure hydrogen stripper bottoms and contains the liquid hydrocarbon fraction having components such as normal hydrocarbons having from about 8 to 24 carbon atoms. A portion of this liquid hydrocarbon fraction in hot high pressure hydrogen stripper bottoms may be used as the hydrocarbon recycle described below.

A portion of the lighter hydrocarbons generated in the deoxygenation zone may be also carried with the hydrogen in the hot high pressure hydrogen stripper and removed in the overhead stream. Any hydrocarbons removed in the overhead stream will effectively bypass the isomerization zone, discussed below. A large portion of the hydrocarbons bypassing the isomerization zone will be normal hydrocarbons which, due to bypassing the isomerization stage, will not be isomerized to branched hydrocarbons. At least a portion of these normal hydrocarbons ultimately end up in the diesel range product or the aviation range product, and depending upon the specifications required for the products, the normal hydrocarbons may have an undesired effect on the diesel range product and the aviation range product. For example, in applications where the diesel range product is required to meet specific cloud point specifications, or where the aviation range product is required to meet specific freeze point specifications, the normal hydrocarbons from the hot high pressure hydrogen stripper overhead may interfere with meeting the required specification. Therefore, in some applications it is advantageous to take steps to prevent normal hydrocarbons from being removed in the hot high pressure hydrogen stripper overhead and bypassing the isomerization zone. For example, one or more, or a mixture of additional rectification agents may be optionally introduced into the hot high pressure hydrogen stripper to reduce the amount of hydrocarbons in the hot high pressure hydrogen stripper overhead stream. Suitable example of additional rectification agents include the diesel boiling point range product, the aviation boiling point range product, the naphtha boiling range product, the mixture of naphtha and LPG, or any combinations thereof. These streams may be recycled and introduced to the hot high pressure hydrogen stripper, at a location of the stripper that is above the deoxygenation zone effluent introduction location and in the rectification zone. The rectification zone, if present, may contain vapor liquid contacting devices such as trays or packing to increase the efficiency of the rectification. The optional rectification agent would operate to force an increased amount of the hydrocarbon product from the deoxygenation zone to travel downward in the hot high pressure hydrogen stripper and be removed in the hot high pressure hydrogen stripper bottoms stream instead of being carried with the stripping hydrogen gas into the hot high pressure hydrogen stripper overhead. Other rectification agents from independent sources may be used instead of, or in combination with, the diesel boiling point range product, the naphtha product, and the naphtha and LPG stream.

Hydrogen is a reactant in at least some of the reactions above, and a sufficient quantity of hydrogen must be in solution to most effectively take part in the catalytic reaction. Past processes have operated at high pressures in order to achieve a desired amount of hydrogen in solution and readily available for reaction. However, higher pressure operations are more costly to build and to operate as compared to their lower pressure counterparts. One advantage of the present invention is the operating pressure may be in the range of about 1379 kPa absolute (200 psia) to about 4826 kPa absolute (700 psia)

which is lower than that found in other previous operations. In another embodiment the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, the rate of reaction is increased resulting in a greater amount of throughput of material through the reactor in a given period of time.

In one embodiment, the desired amount of hydrogen is kept in solution at lower pressures by employing a large recycle of hydrocarbon to the deoxygenation reaction zone. Other processes have employed hydrocarbon recycle in order to control the temperature in the reaction zones since the reactions are exothermic reactions. However, the range of recycle to feedstock ratios used herein is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the combined liquid phase in the reaction zone is greatly increased and higher pressures are not needed to increase the amount of hydrogen in solution. In one embodiment of the invention, the volume ratio of hydrocarbon recycle to feedstock is from about 1:1 or about 2:1 to about 8:1. In another embodiment the ratio is in the range of about 3:1 to about 6:1 and in yet another embodiment the ratio is in the range of about 4:1 to about 5:1.

Although the hydrocarbon fraction separated in the hot high pressure hydrogen stripper is useful as a diesel fuel or diesel fuel blending component, because it comprises essentially n-paraffins, it will have poor cold flow properties. Also, depending upon the feedstock, the amount of hydrocarbons suitable for aviation fuel or aviation fuel blending component may be small. Therefore the hydrocarbon fraction is contacted with an isomerization catalyst under isomerization conditions to at least partially isomerize the n-paraffins to branched paraffins and improve the cold flow properties of the liquid hydrocarbon fraction. The isomerization catalysts and operating conditions are selected so that the isomerization catalyst also catalyzes selective hydrocracking of the paraffins. The selective hydrocracking creates hydrocarbons in the aviation boiling point range. The effluent of the second reaction zone, the isomerization and selective hydrocracking zone, is a branched-paraffin-enriched stream. By the term "enriched" it is meant that the effluent stream has a greater concentration of branched paraffins than the stream entering the isomerization zone, and preferably comprises greater than 50 mass-% branched paraffins. It is envisioned that the isomerization zone effluent may contains 70, 80, or 90 mass-% branched paraffins. Isomerization and selective hydrocracking can be carried out in a separate bed of the same reactor, described above or the isomerization and selective hydrocracking can be carried out in a separate reactor. For ease of description, the following will address the embodiment where a second reactor is employed for the isomerization and selective hydrocracking reactions. The hydrogen stripped product of the deoxygenation reaction zone is contacted with an isomerization and selective hydrocracking catalyst in the presence of hydrogen at isomerization and selective hydrocracking conditions to isomerize at least a portion of the normal paraffins to branched paraffins. Due to the presence of hydrogen, the reactions may be called hydroisomerization and hydrocracking.

The isomerization and selective hydrocracking of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable. See also, for example, US 2004/0230085 A1 which is incorporated by reference in its entirety. Catalysts having an acid function and mild hydrogenation function are favorable for catalyzing both the isomerization reaction and the selective hydrocracking reaction. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline or a combination of the two. Suitable support materials include aluminas, amorphous silica-aluminas, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-1, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for selective hydrocracking and isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization and selective hydrocracking catalyst may also comprise a modifier selected from the group consisting of lanthanum, cerium, praseodymium, neodymium, phosphorus, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. An activated carbon catalyst support may also be used. U.S. Pat. No. 5,981,419 and U.S. Pat. No. 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization and selective hydrocracking catalyst may be any of those well known in the art such as those described and cited above. Isomerization and selective cracking conditions include a temperature of about 150° C. to about 360° C. and a pressure of about 1724 kPa absolute (250 psia) to about 4726 kPa absolute (700 psia). In another embodiment the isomerization conditions include a temperature of about 300° C. to about 360° C. and a pressure of about 3102 kPa absolute (450 psia) to about 3792 kPa absolute (550 psia). Other operating conditions for the isomerization and selective hydrocracking zone are well known in the art. Some known isomerization catalysts, when operated under more severe conditions, also provide the selective hydrocracking catalytic function.

The isomerization and selective cracking zone effluent is processed through one or more separation steps to obtain two purified hydrocarbon streams, one useful as a diesel fuel or a diesel fuel blending component and the second useful as aviation fuel or an aviation fuel blending component. Depending upon the application, various additives may be combined with the diesel or aviation fuel composition generated in order to meet required specifications for different specific fuels. In particular, the aviation fuel composition generated herein complies with, is a blending component for, or may be combined with one or more additives to meet at least one of: ASTM D 1655 Specification for Aviation Turbine Fuels Defense Stan 91-91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MIL-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification MIL-DTL-83133, which is a military grade type of highly refined kerosene based jet propellant specified by the United States Government. The fuel produced from glycerides or FAAs is very similar to isoparaffinic kerosene or iPK, also known as a synthetic jet fuel or synthetic paraffinic kerosene, SPK.

The specifications for different types of fuels are often expressed through acceptable ranges of chemical and physical requirements of the fuel. As stated above, aviation turbine fuels, a kerosene type fuel including JP-8, are specified by ML-DTL-83133, JP-4, a blend of gasoline, kerosene and light distillates, is specified by MIL-DTL-5624 and JP-5 a kerosene type fuel with low volatility and high flash point is also specified by MIL-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet the specification is quite common. While the product of the present invention may meet fuel specifications, it is expected that some blending of the product with other blending components may be required to meet the desired set of fuel specifications. In other words, the aviation product of this invention is a composition which may be used with other components to form a fuel meeting at least one of the specifications for aviation fuel such as JP-8. The desired products are highly paraffinic distillate fuel components having a paraffin content of at least 75% by volume.

With the effluent stream of the isomerization and selective hydrocracking zone comprising both a liquid component and a gaseous component, various portions of which may be recycled, multiple separation steps may be employed. For example, hydrogen may be first separated in a isomerization effluent separator with the separated hydrogen being removed in an overhead stream. Suitable operating conditions of the isomerization effluent separator include, for example, a temperature of 230° C. and a pressure of 4100 kPa absolute (600 psia). If there is a low concentration of carbon oxides, or the carbon oxides are removed, the hydrogen may be recycled back to the hot high pressure hydrogen stripper for use both as a rectification gas and to combine with the remainder as a bottoms stream. The remainder is passed to the isomerization reaction zone and thus the hydrogen becomes a component of the isomerization reaction zone feed streams in order to provide the necessary hydrogen partial pressures for the reactor. The hydrogen is also a reactant in the deoxygenation reactors, and different feedstocks will consume different amounts of hydrogen. The isomerization effluent separator allows flexibility for the process to operate even when larger amounts of hydrogen are consumed in the first reaction zone. Furthermore, at least a portion of the remainder or bottoms stream of the isomerization effluent separator may be recycled to the isomerization reaction zone to increase the degree of isomerization.

The remainder of the isomerization effluent after the removal of hydrogen still has liquid and gaseous components and is cooled, by techniques such as air cooling or water cooling and passed to a cold separator where the liquid component is separated from the gaseous component. Suitable operating conditions of the cold separator include, for example, a temperature of about 20 to 60° C. and a pressure of 3850 kPa absolute (560 psia). A water byproduct stream is also separated. At least a portion of the liquid component, after cooling and separating from the gaseous component, may be recycled back to the isomerization zone to increase the degree of isomerization. Prior to entering the cold separator, the remainder of the isomerization and selective hydrocracking zone effluent may be combined with the hot high pressure hydrogen stripper overhead stream, and the resulting combined stream may be introduced into the cold separator.

The liquid component contains the hydrocarbons useful as diesel fuel or diesel fuel blending components and aviation fuel or aviation fuel blending components, termed diesel boiling point range product and aviation boiling point range product, respectively, as well as smaller amounts of naphtha and LPG. The separated liquid component is further purified in a product distillation zone which separates lower boiling components and dissolved gases into an LPG and naphtha stream; an aviation range product; and a diesel range product. Suitable operating conditions of the product distillation zone include a temperature of from about 20 to about 200° C. at the overhead and a pressure from about 0 to about 1379 kPa absolute (0 to 200 psia). The conditions of the distillation zone may be adjusted to control the relative amounts of hydrocarbon contained in the aviation range product stream and the diesel range product stream.

The LPG and naphtha stream may be further separated in a debutanizer or depropanizer in order to separate the LPG into an overhead stream, leaving the naphtha in a bottoms stream. Suitable operating conditions of this unit include a temperature of from about 20 to about 200° C. at the overhead and a pressure from about 0 to about 2758 kPa absolute (0 to 400 psia). The LPG may be sold as valuable product or may be used in other processes such as a feed to a hydrogen production facility. Similarly, the naphtha may be used in other processes, such as the feed to a hydrogen production facility.

The gaseous component separated in the product separator comprises mostly hydrogen and the carbon dioxide from the decarboxylation reaction. Other components such as carbon monoxide, propane, and hydrogen sulfide or other sulfur containing component may be present as well. It is desirable to recycle the hydrogen to the isomerization zone, but if the carbon dioxide was not removed, its concentration would quickly build up and effect the operation of the isomerization zone. The carbon dioxide can be removed from the hydrogen by means well known in the art such as reaction with a hot carbonate solution, pressure swing absorption, etc. Amine absorbers may be employed as taught in copending U.S. applications U.S. Ser. No. 12/193,176 and U.S. Ser. No. 12/193,196, hereby incorporated by reference. If desired, essentially pure carbon dioxide can be recovered by regenerating the spent absorption media.

Similarly, a sulfur containing component such as hydrogen sulfide may be present to maintain the sulfided state of the deoxygenation catalyst or to control the relative amounts of the decarboxylation reaction and the hydrogenation reaction that are both occurring in the deoxygenation zone. The amount of sulfur is generally controlled and so must be removed before the hydrogen is recycled. The sulfur components may be removed using techniques such as absorption with an amine or by caustic wash. Of course, depending upon the technique used, the carbon dioxide and sulfur containing components, and other components, may be removed in a single separation step such as a hydrogen selective membrane.

The hydrogen remaining after the removal of at least carbon dioxide may be recycled to the reaction zone where hydrogenation primarily occurs and/or to any subsequent beds or reactors. The recycle stream may be introduced to the inlet of the reaction zone and/or to any subsequent beds or reactors. One benefit of the hydrocarbon recycle is to control the temperature rise across the individual beds. However, as discussed above, the amount of hydrocarbon recycle may be determined based upon the desired hydrogen solubility in the reaction zone which is in excess of that used for temperature control. Increasing the hydrogen solubility in the reaction mixture allows for successful operation at lower pressures, and thus reduced cost.

As discussed above, at least a portion of the diesel boiling point range product; at least a portion of the aviation boiling point range product, at least a portion of the LPG and naphtha stream; at least a portion of a naphtha stream or an LPG stream generated by separating the LPG and naphtha stream into an LPG stream and the naphtha stream; or any combination thereof may be recycled to the optional rectification zone of the hot high pressure hydrogen stripper.

The following embodiments are presented in illustration of this invention and is not intended as an undue limitation on the generally broad scope of the invention as set forth in the claims. First one embodiment of the process is described in general as with reference to FIG. 1. Then the same embodiment of the process is described in more detail with reference to FIG. 2. Different embodiments are described with reference to FIG. 3 and FIG. 4. The embodiment where at least a portion of the aviation boiling point range product is recycled to the optional rectification zone of the hot high pressure hydrogen stripper is not shown in the figures, but may be readily extrapolated by one of ordinary skill in the art from the embodiments that are shown.

Turning to FIG. 1 renewable feedstock 102 enters deoxygenation reaction zone 104 along with recycle hydrogen 126. Deoxygenated product 106 is stripped in hot high pressure hydrogen stripper 108 using hydrogen 114a. Carbon oxides and water vapor are removed with hydrogen in overhead 110. Selectively stripped deoxygenated product is passed to isomerization and selective hydrocracking zone 116 along with recycle hydrogen 126a and make-up hydrogen 114b. Isomerized and selectively hydrocracked product 118 is combined with overhead 110 and passed to product recovery zone 120. Carbon oxide stream 128, light ends stream 130, water byproduct stream 124, hydrogen stream 126, a first branched paraffin-enriched product 122, and a second branched paraffin-enriched product 123 are removed from product recovery zone 120. First branched paraffin-enriched product 122 may be collected for use as diesel fuel or a diesel fuel blending component, second branched paraffin-enriched product 121 may be collected for use as aviation fuel or an aviation fuel blending component, and hydrogen stream 126 is recycled to the deoxygenation reaction zone 104. Optionally, a portion of branched paraffin-enriched product 122 is routed in line 125 to hot high pressure hydrogen stripper 108 optional rectification zone 123 and used as a rectification agent.

Figure 2:
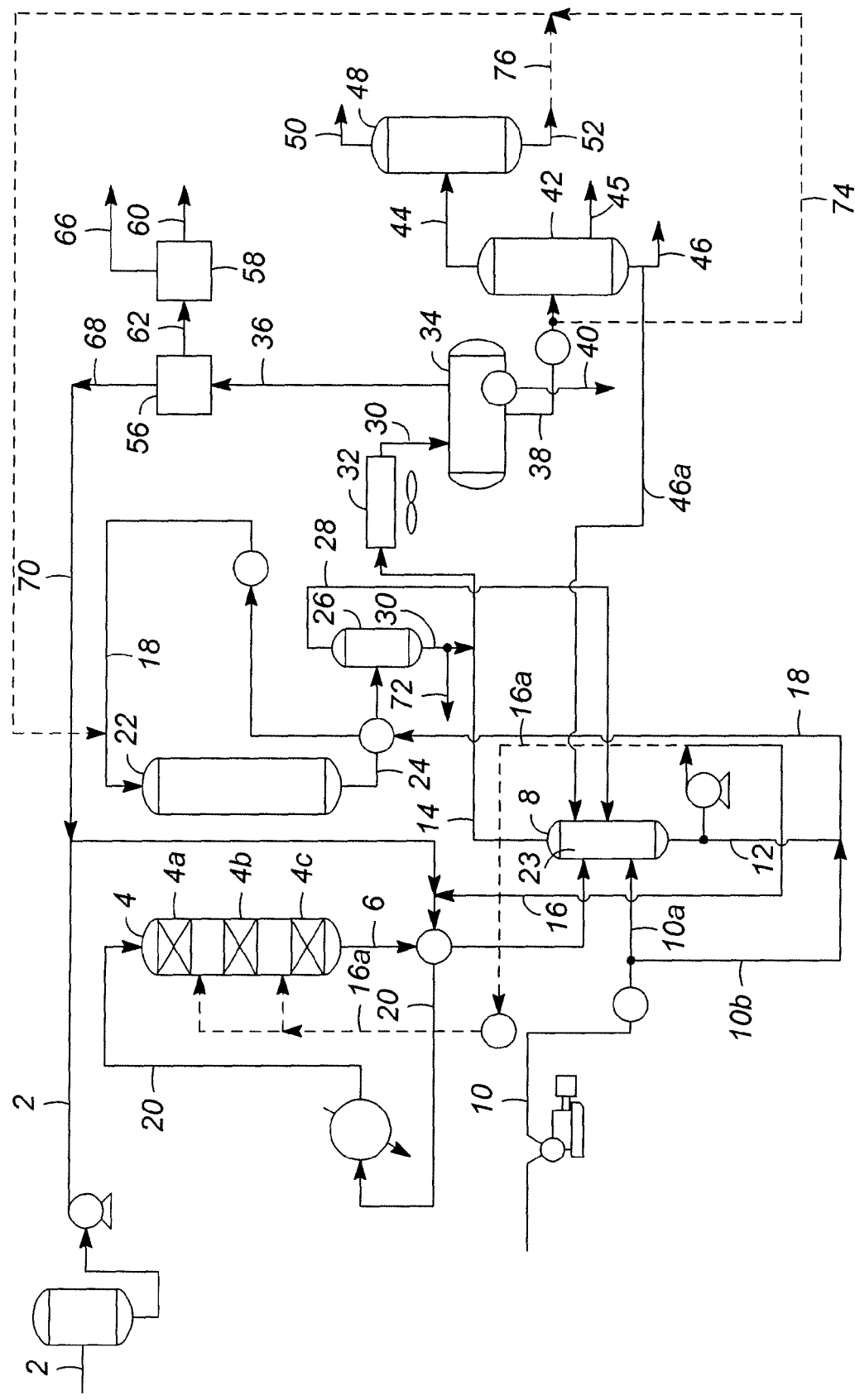
FIG. 2 is a schematic of one embodiment of the invention showing the option where a portion of the diesel range product is conducted to the hot high pressure hydrogen stripper as an additional rectification agent to decrease the amount of first reaction zone product carried in the overhead of the selective hot high pressure hydrogen stripper

Turning to FIG. 2, the process begins with a renewable feedstock stream 2 which may pass through an optional feed surge drum. The feedstock stream is combined with recycle gas stream 68 and recycle stream 16 to form combined feed stream 20, which is heat exchanged with reactor effluent and then introduced into deoxygenation reactor 4. The heat exchange may occur before or after the recycle is combined with the feed. Deoxygenation reactor 4 may contain multiple beds shown in FIG. 2 as 4a, 4b and 4c. Deoxygenation reactor 4 contains at least one catalyst capable of catalyzing decarboxylation and/or hydrodeoxygenation of the feedstock to remove oxygen. Deoxygenation reactor effluent stream 6 containing the products of the decarboxylation and/or hydrodeoxygenation reactions is removed from deoxygenation reactor 4 and heat exchanged with stream 20 containing feed to the deoxygenation reactor. Stream 6 comprises a liquid component containing largely normal paraffin hydrocarbons in the diesel boiling point range and a gaseous component containing largely hydrogen, vaporous water, carbon monoxide, carbon dioxide and propane.

Deoxygenation reactor effluent stream 6 is then directed to hot high pressure hydrogen stripper 8. Make up hydrogen in line 10 is divided into two portions, stream 10a and 10b. Make up hydrogen in stream 10a is also introduced to hot high pressure hydrogen stripper 8. In hot high pressure hydrogen stripper 8, the gaseous component of deoxygenation reactor effluent 6 is selectively stripped from the liquid component of deoxygenation reactor effluent 6 using make-up hydrogen 10a and recycle hydrogen 28. The dissolved gaseous component comprising hydrogen, vaporous water, carbon monoxide, carbon dioxide and at least a portion of the propane, is selectively separated into hot high pressure hydrogen stripper overhead stream 14. The remaining liquid component of deoxygenation reactor effluent 6 comprising primarily normal paraffins having a carbon number from about 8 to about 24 with a cetane number of about 60 to about 100 is removed as hot high pressure hydrogen stripper bottom 12.

A portion of hot high pressure hydrogen stripper bottoms forms recycle stream 16 and is combined with renewable feedstock stream 2 to create combined feed 20. Another portion of recycle stream 16, optional stream 16a, may be routed directly to deoxygenation reactor 4 and introduced at interstage locations such as between beds 4a and 4b and or between beds 4b and 4c in order, or example, to aid in temperature control. The remainder of hot high pressure hydrogen stripper bottoms in stream 12 is combined with hydrogen stream 10b to form combined stream 18 which is routed to isomerization and selective hydrocracking reactor 22. Stream 18 may be heat exchanged with isomerization reactor effluent 24.

The product of the isomerization and selective hydrocracker reactor containing a gaseous portion of hydrogen and propane and a branched-paraffin-enriched liquid portion is removed in line 24, and after optional heat exchange with stream 18, is introduced into hydrogen separator 26. The overhead stream 28 from hydrogen separator 26 contains primarily hydrogen which may be recycled back to hot high pressure hydrogen stripper 8. Bottom stream 30 from hydrogen separator 26 is air cooled using air cooler 32 and introduced into product separator 34. In product separator 34 the gaseous portion of the stream comprising hydrogen, carbon monoxide, hydrogen sulfide, carbon dioxide and propane are removed in stream 36 while the liquid hydrocarbon portion of the stream is removed in stream 38. A water byproduct stream 40 may also be removed from product separator 34. Stream 38 is introduced to product stripper 42 where components having higher relative volatilities are separated into stream 44, components within the boiling range of aviation fuel is removed in stream 45, with the remainder, the diesel range components, being withdrawn from product stripper 42 in line 46. Optionally, a portion of the diesel range components in line 46 are recycled in line 46a to hot high pressure hydrogen stripper 8 optional rectification zone 23 and used as an additional rectification agent. Stream 44 is introduced into fractionator 48 which operates to separate LPG into overhead 50 leaving a naphtha bottoms 52. Any of optional lines 72, 74, or 76 may be used to recycle at least a portion of the isomerization zone effluent back to the isomerization zone to increase the amount of n-paraffins that are isomerized to branched paraffins.

The vapor stream 36 from product separator 34 contains the gaseous portion of the isomerization effluent which comprises at least hydrogen, carbon monoxide, hydrogen sulfide, carbon dioxide and propane and is directed to a system of amine absorbers to separate carbon dioxide and hydrogen sulfide from the vapor stream. Because of the cost of hydrogen, it is desirable to recycle the hydrogen to deoxygenation reactor 4, but it is not desirable to circulate the carbon dioxide or an excess of sulfur containing components. In order to separate sulfur containing components and carbon dioxide from the hydrogen, vapor stream 36 is passed through a system of at least two amine absorbers, also called scrubbers, starting with the first amine absorber zone 56. The amine chosen to be employed in first amine scrubber 56 is capable of selectively removing at least both the components of interest, carbon dioxide and the sulfur components such as hydrogen sulfide. Suitable amines are available from DOW and from BASF, and in one embodiment the amines are a promoted or activated methyldiethanolamine (MDEA). See U.S. Pat. No. 6,337,059, hereby incorporated by reference in its entirety. Suitable amines for the first amine absorber zone from DOW include the UCARSOL™ AP series solvents such as AP802, AP804, AP806, AP810 and AP814. The carbon dioxide and hydrogen sulfide are absorbed by the amine while the hydrogen passes through first amine scrubber zone and into line 68 to be recycled to the first reaction zone. The amine is regenerated and the carbon dioxide and hydrogen sulfide are released and removed in line 62. Within the first amine absorber zone, regenerated amine may be recycled for use again. The released carbon dioxide and hydrogen sulfide in line 62 are passed through second amine scrubber zone 58 which contains an amine selective to hydrogen sulfide, but not selective to carbon dioxide. Again, suitable amines are available from DOW and from BASF, and in one embodiment the amines are a promoted or activated MDEA. Suitable amines for the second amine absorber zone from DOW include the UCARSOL™ HS series solvents such as HS101, HS 102, HS103, HS104, HS115. Therefore the carbon dioxide passes through second amine scrubber zone 58 and into line 66. The amine may be regenerated which releases the hydrogen sulfide into line 60. Regenerated amine is then reused, and the hydrogen sulfide may be recycled to the deoxygenation reaction zone. Conditions for the first scrubber zone includes a temperature in the range of 30 to 60° C. The first absorber is operated at essentially the same pressure as the reaction zone. By "essentially" it is meant that the operating pressure of the first absorber is within about 1034 kPa absolute (150 psia) of the operating pressure of the reaction zone. For example, the pressure of the first absorber is no more than 1034 kPa absolute (150 psia) less than that of the reaction zone. The second amine absorber zone is operated in a pressure range of from 138 kPa absolute (20 psia) to 241 kPa absolute (35 psia). Also, at least the first the absorber is operated at a temperature that is at least 1° C. higher than that of the separator. Keeping the absorbers warmer than the separator operates to maintain any light hydrocarbons in the vapor phase and prevents the light hydrocarbons from condensing into the absorber solvent.

Figure 3:
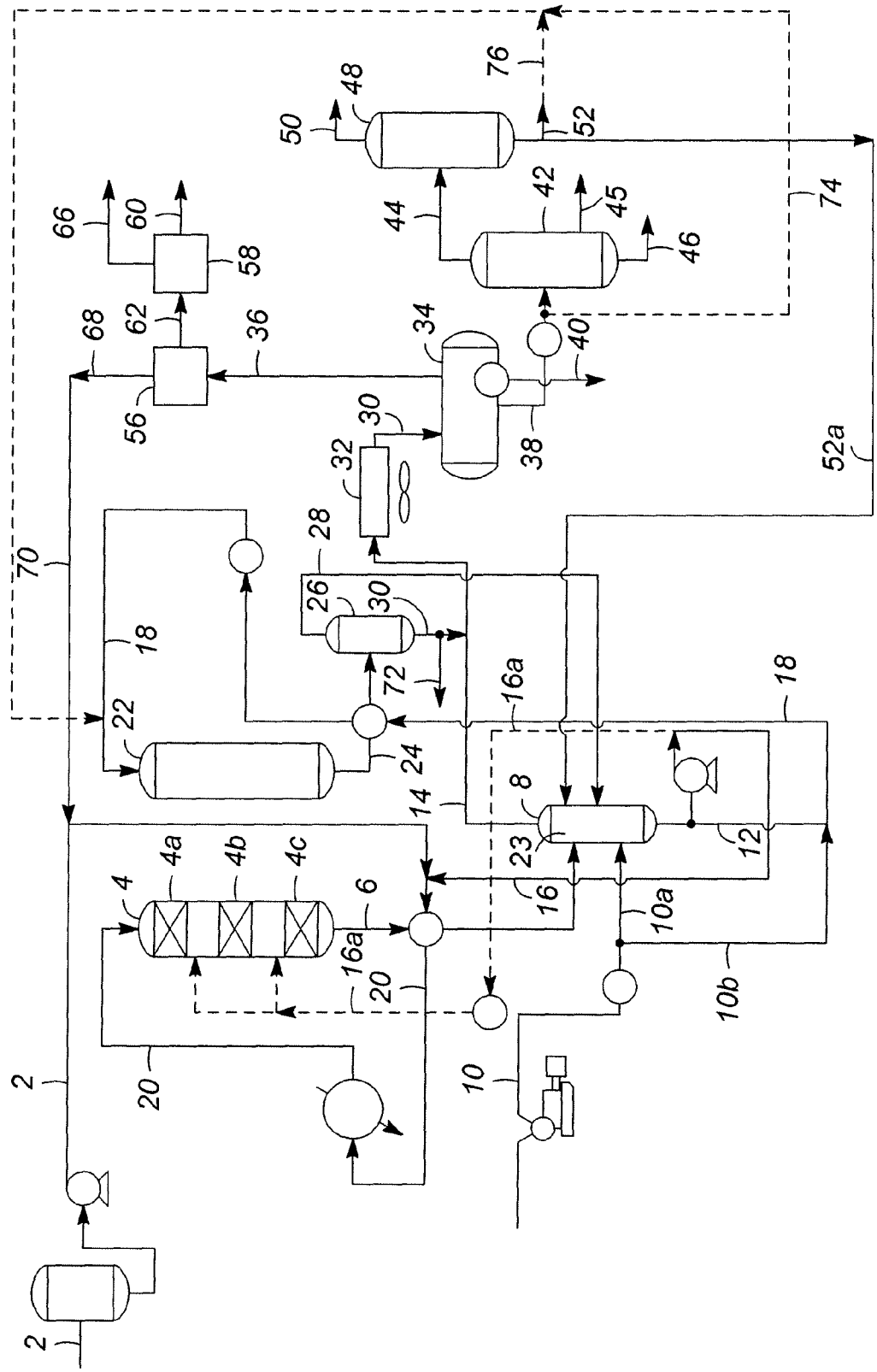
FIG. 3 is a schematic of one embodiment of the invention showing the option where a portion of the naphtha range product is conducted to the hot high pressure hydrogen stripper as an additional rectification agent to decrease the amount of first reaction zone product carried in the overhead of the selective hot high pressure hydrogen stripper

Turning to FIG. 3, the embodiment is the same as described above with respect to FIG. 2 with the exception of instead of a portion of the diesel range components in line 46 being optionally recycled in line 46a to hot high pressure hydrogen stripper 8 optional rectification zone 23 and used as a rectification agent, a portion of naphtha bottoms 52 is optionally recycled in line 52a to hot high pressure hydrogen stripper 8 optional rectification zone 23 and used as a rectification agent.

Figure 4:
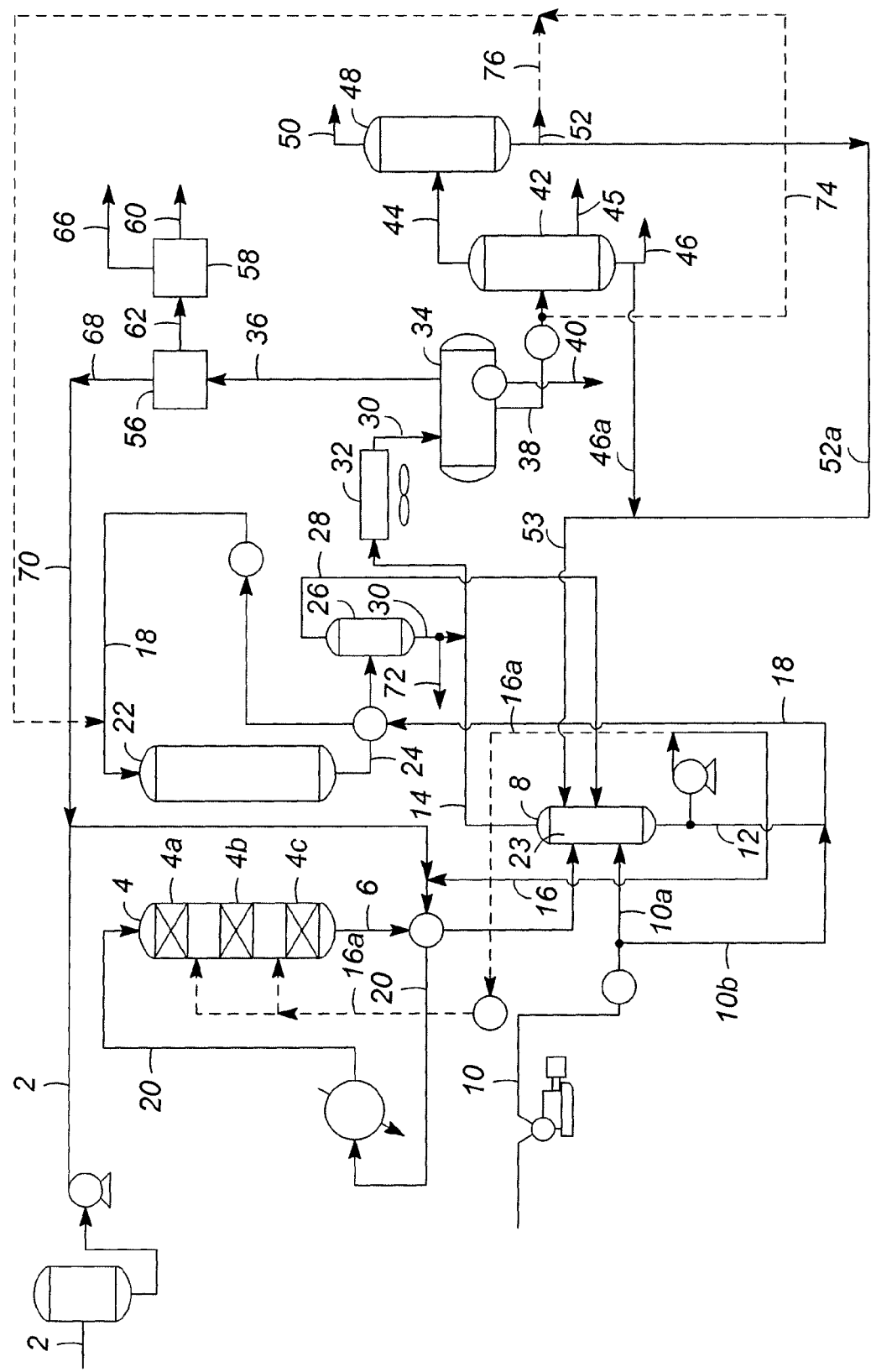
FIG. 4 is a schematic of one embodiment of the invention showing the option where a portion of the diesel range product and a portion of the naphtha range product are conducted to the hot high pressure hydrogen stripper as additional rectification agents to decrease the amount of first reaction zone product carried in the overhead of the selective hot high pressure hydrogen stripper.

Turning to FIG. 4, the embodiment is the same as described above with respect to FIG. 2 with the exception of instead of a portion of the diesel range components in line 46 being optionally recycled in line 46a to hot high pressure hydrogen stripper 8 optional rectification zone 23 and used as a rectification agent, the diesel range components in line 46a and portion of naphtha bottoms 52 in line 52a are combined to form rectification agent stream 53 which is optionally recycled to hot high pressure hydrogen stripper 8 optional rectification zone 23 and used as a rectification agent.

Minimizing the amount of normal paraffins that bypass the isomerization and selective hydrocracking zone helps to meet freeze point specifications for many aviation fuels without having to significantly lower the quantity of aviation fuel produced. Normal paraffins that bypass the isomerization and selective hydrocracking zone are not isomerized and the normal paraffins generally have higher freeze points than the corresponding isomerized paraffins. To demonstrate the success of the optional rectification zone, the invention both including and not including the rectification zone in the hot high pressure hydrogen stripper was simulated in a model simulation. In the simulations, a maximum distillate production was set and a −10° C. cloud point target for the diesel range product was set. In the simulation where the optional rectification zone was not employed, the overall percentage of hydrocarbons in the aviation range plus the diesel range that bypassed the isomerization and selective cracking zone via the hot high pressure hydrogen stripper overhead stream was determined to be 4.95 mass-% and the percentage of hydrocarbons in the aviation range that bypassed the isomerization and selective cracking zone via the hot high pressure hydrogen stripper overhead stream was determined to be 5.45 mass-%. The simulation was repeated, this time using the optional rectification zone in the hot high pressure hydrogen stripper as shown in FIG. 2. In this simulation, the overall percentage of hydrocarbons in the aviation range plus the diesel range that bypassed the isomerization and selective cracking zone via the hot high pressure hydrogen stripper overhead stream was determined to be 1.12 mass-% and the percentage of hydrocarbons in the aviation range that bypassed the isomerization and selective cracking zone via the hot high pressure hydrogen stripper overhead stream was determined to be 4.07 mass-%. The result of this change corresponds to either a reduction of aviation fuel product freeze point of 7° C. at a constant aviation fuel product yield of 10.4 mass-%, or an increase in aviation fuel production of 9 mass-% at a constant −40° C. freeze point.

The invention claimed is:

1. A process for producing a diesel boiling point range product and an aviation boiling point range product from a renewable feedstock comprising;
    a) treating the feedstock in a first reaction zone by hydrogenating and deoxygenating the renewable feedstock using a catalyst at reaction conditions in the presence of hydrogen to provide a first reaction zone product stream comprising hydrogen, water, carbon dioxide, and a hydrocarbon fraction comprising paraffins in the diesel boiling point range and in the aviation boiling point range; and
    b) selectively separating, in a hot high pressure hydrogen stripper, a gaseous stream comprising at least a portion of the hydrogen, water, and carbon oxides from the first reaction zone product stream and a remainder stream comprising at least the paraffins;
    c) introducing the remainder stream to a second reaction zone to contact an isomerization and selective hydrocracking catalyst at isomerization and selective cracking conditions to selectively hydrocrack at least a portion of the paraffins and to isomerize at least a portion of the paraffins and generate a branched paraffin-enriched stream;
    d) cooling the branched paraffin-enriched stream and the gaseous stream and separating a gaseous component comprising at least hydrogen and carbon dioxide from a liquid hydrocarbon component and a water component;
    e) separating the liquid hydrocarbon component into an overhead stream, a diesel boiling point range product, and an aviation boiling point range product.

2. The process of claim 1 further comprising recycling, to a rectification zone in the hot high pressure hydrogen stripper, a stream selected from the group consisting of: at least a portion of the diesel boiling point range product; at least a portion of the aviation boiling point range product; and a combination thereof.

3. The process of claim 1 wherein the overhead stream comprises naphtha and LPG, the process further comprising recycling, to a rectification zone in the hot high pressure hydrogen stripper, a stream selected from the group consisting of:
    i) at least a portion of the diesel boiling point range product;
    ii) at least a portion of the LPG and naphtha stream;
    iii) at least a portion of a naphtha stream generated by separating the LPG and naphtha stream into an LPG stream and the naphtha stream;
    iv) at least a portion of the aviation boiling point range product; and
    v) any combination thereof.

4. The process of claim 1 wherein the branched paraffin-enriched stream further comprises hydrogen and at least a portion of the hydrogen is separated from the branched paraffin-enriched stream.

5. The process of claim 3 further comprising recycling the hydrogen removed from the branched paraffin-enriched stream to the hot high pressure hydrogen stripper.

6. The process of claim 1 further comprising recycling the gaseous component comprising at least hydrogen and carbon dioxide to the first reaction zone.

7. The process of claim 1 further comprising recycling a portion of the remainder stream comprising a least the paraffins to the first reaction zone at a volume ratio of recycle to feedstock in the range of about 1:1 to about 8:1.

8. The process of claim 7 wherein the reaction conditions in the first reaction zone include a temperature of about 40° C. to about 400° C. and a pressure of about 689 kPa absolute (100 psia) to about 13,790 kPa absolute (2000 psia).

9. The process of claim 1 wherein the overhead stream comprises LPG and naphtha, the process further comprising separating the LPG and naphtha stream into an LPG stream and a naphtha stream.

10. The process of claim 9 further comprising recycling at least a portion of the naphtha stream to the second reaction zone.

11. The process of claim 1 further comprising recycling at least a portion of the branched paraffin-enriched stream to the second reaction zone.

12. The process of claim 1 wherein the first and second reaction zones are operated at conditions including a temperature of about 40° C. to about 400° C. and a pressure of about 689 kPa absolute (100 psia) to about 13,790 kPa absolute (2000 psia).

13. The process of claim 1 wherein the hot high pressure hydrogen stripper is operated at a temperature of about 40° C. to about 300° C. and a pressure of about 689 kPa absolute (100 psia) to about 13,790 kPa absolute (2000 psia).

14. The process of claim 1 wherein the hot high pressure hydrogen stripper is operated at a pressure that is within 1034 kPa absolute (150 psia) that of the first reaction zone.

15. The process of claim 1 wherein the second reaction zone is operated at a pressure at least about 345 kPa absolute (50 psia) greater than that of the first reaction zone.

16. The process of claim 1 wherein the renewable feedstock is in a mixture or co-feed with a petroleum hydrocarbon feedstock, and the petroleum hydrocarbon feedstock is co-processed with the renewable feedstock.

17. The process of claim 1 wherein the renewable feedstock comprises at least one component selected from the group consisting of canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm oil, crambe oil, kernel oil, and fatty acid alkyl esters.

18. A diesel boiling point range product and an aviation boiling point range product as produced by the process of claim 1.

19. The process of claim 1 further comprising mixing one or more additives to the diesel boiling point range product, the aviation boiling point range product, or both.

20. A fuel that meets the specification properties of MTL-DTL-83133 wherein at least one component of the fuel is the aviation boiling point range product produced by the process of claim 1.

* * * * *